US012299211B2

(12) United States Patent
Hughes et al.

(10) Patent No.: US 12,299,211 B2
(45) Date of Patent: May 13, 2025

(54) PROFILE CACHING FOR A PERIPHERAL DEVICE

(71) Applicant: Logitech Europe S.A., Lausanne (CH)

(72) Inventors: Chris Hughes, Oakland, CA (US);
Jacob Kottage, Liverpool, NY (US);
Christine Flores, Seattle, WA (US);
Andrew Coonrad, Newark, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/451,722

(22) Filed: Aug. 17, 2023

(65) Prior Publication Data

US 2025/0060836 A1    Feb. 20, 2025

(51) Int. Cl.
*G06F 3/023* (2006.01)

(52) U.S. Cl.
CPC .................. *G06F 3/0238* (2013.01)

(58) Field of Classification Search
CPC .......... G06F 3/0238; G06F 3/041–047; G06F 2203/041–04114; G06F 3/0233; G06F 3/023; G06F 3/02; G06F 3/021; G06F 3/04886; G06F 3/0219; G06F 21/83; G06F 3/0231; G06F 15/0225
See application file for complete search history.

(56) References Cited

U.S. PATENT DOCUMENTS

| 2004/0150535 A1* | 8/2004 | Sun ....................... G06F 3/0238 345/172 |
| 2018/0219553 A1* | 8/2018 | Casparian ............. H01F 7/0226 |
| 2020/0167071 A1* | 5/2020 | Heo ........................ G06F 16/55 |

FOREIGN PATENT DOCUMENTS

CN        115221076 A   * 10/2022

OTHER PUBLICATIONS

CN 115221076 (Year: 2022).*
CN-115221076-A (Year: 2022).*

* cited by examiner

*Primary Examiner* — Sanjiv D. Patel
(74) *Attorney, Agent, or Firm* — Kilpatrick Townsend & Stockton LLP

(57) ABSTRACT

A computer-implemented method comprising: receiving, by one or more processors of a keyboard device from a host computing device communicatively coupled thereto, a request to switch to a first key input profile for a plurality of keys on the keyboard device; determining whether the first key input profile is locally stored on the keyboard device in a persistent memory; in response to determining that the first key input profile is stored in persistent memory, programming the plurality of keys using the first key input profile stored in the persistent memory; and in response to determining that the first key input profile is not stored in persistent memory: writing the first key input profile to persistent memory when the first key input profile is at least n bytes in size and programming the plurality of keys using the first key input profile.

17 Claims, 7 Drawing Sheets

PROFILE CACHING FOR A PERIPHERAL DEVICE

BACKGROUND

Keyboards are a staple in modern computing systems and have been so since the advent of personal computers. constantly improving with better materials (e.g., aluminum key frames), new innovations (e.g., feedback profiles), increased functionality (e.g., media control), and broader applicability. Keyboards are designed to be used by a wide assortment of users and a corresponding wide array of applications.

For example, some users may prefer a conventional QWERTY style keyboard key arrangement, while some may prefer a DVORAK key layout. Some applications may have their own key assignments that differ from a default keyboard layout. Consider, for instance, that photo editing software, music production software, or video games, may have certain key assignments that relate to a function that is specific to that application but different for other applications. For example, pressing 'D' in a photo editing application may deselect an object, while the same key press may indicate a turn-right function in an FPS game. Thus, the ability to switch key layouts for specific applications or user preferences is a useful function. However, there are shortcomings with high performance usage of key layout management across multiple applications and platforms in many contemporary keyboard designs.

BRIEF SUMMARY

In certain embodiments, a computer-implemented method comprises: receiving, by one or more processors of a keyboard device from a host computing device communicatively coupled thereto, a request to switch to a first key input profile for a plurality of keys on the keyboard device; determining whether the first key input profile is locally stored on the keyboard device in a persistent memory; in response to determining that the first key input profile is stored in persistent memory, programming the plurality of keys using the first key input profile stored in the persistent memory; and in response to determining that the first key input profile is not stored in persistent memory: writing the first key input profile to persistent memory when the first key input profile is at least n bytes in size and programming the plurality of keys using the first key input profile. In some aspects, the request to switch the first key input profile for the plurality of keys on the keyboard device includes a first hash code that represents the first key input profile, and determining whether the first key input profile is locally stored on the keyboard device in the persistent memory is based on matching the first hash code with any other hash codes of the key input profiles stored in the persistent memory.

In some embodiments, the persistent memory includes a second key input profile with a corresponding second hash code, wherein determining that the first key input profile is not stored in persistent memory further includes: determining that the first hash code does not match any other hash codes of the key input profiles stored in the persistent memory; determining a threshold match between the first key input profile and the second key input profile when the first key input profile differs from the second key input profile by less than a delta of m key assignments; receiving delta data from the host computing device corresponding only to key assignments that differ from the first key input profile to the second key input profile; and programming the plurality of keys to match the first key input profile using the second key profile in persistent memory and the delta data. In certain embodiments, further in response to the determining that the first key input profile is not stored in persistent memory: writing the first key input profile to persistent memory when: the first key input profile is at least n bytes in size; and the first key input profile is included in a rolling ledger of the last x key input profiles in use. In some cases, further in response to the determining that the first key input profile is not stored in persistent memory: writing the first key input profile to persistent memory when the first key input profile: is at least n bytes in size; is included in a rolling ledger of the last x key input profiles in use; and the persistent memory has not exceeded y % of its recommended write cycles. In certain implementations, further in response to the determining that the first key input profile is not stored in persistent memory: writing the first key input profile to persistent memory when the first key input profile: is at least n bytes in size; is included in a rolling ledger of the last x key input profiles in use; and no previous writes to persistent memory have occurred in the last z sessions. In some aspects, further in response to the determining that the first key input profile is not stored in persistent memory: writing the first key input profile to persistent memory when the first key input profile: is at least n bytes in size; is included in a rolling ledger of the last x key input profiles in use; and the persistent memory has not exceeded y % of its recommended write cycles.

In certain embodiments, a keyboard device comprises: one or more processors; one or more non-transitory, computer-readable storage mediums containing instructions configured to cause the one or more processors to perform operations including: receiving, by the one or more processors from a host computing device communicatively coupled thereto, a request to switch to a first key input profile for a plurality of keys on the keyboard device; determining whether the first key input profile is locally stored on the keyboard device in a persistent memory; in response to determining that the first key input profile is stored in persistent memory, programming the plurality of keys using the first key input profile stored in the persistent memory; and in response to determining that the first key input profile is not stored in persistent memory: writing the first key input profile to persistent memory when the first key input profile is at least n bytes in size and programming the plurality of keys using the first key input profile. In some aspects, the request to switch the first key input profile for the plurality of keys on the keyboard device includes a first hash code that represents the first key input profile, and determining whether the first key input profile is locally stored on the keyboard device in the persistent memory is based on matching the first hash code with any other hash codes of the key input profiles stored in the persistent memory. In some implementations, the persistent memory includes a second key input profile with a corresponding second hash code, wherein determining that the first key input profile is not stored in persistent memory further includes: determining that the first hash code does not match any other hash codes of the key input profiles stored in the persistent memory; determining a threshold match between the first key input profile and the second key input profile when the first key input profile differs from the second key input profile by less than a delta of m key assignments; receiving delta data from the host computing device corresponding only to key assignments that differ from the first key input profile to the second key input profile; and programming the plurality of keys to match the first key input profile using the second key profile in persistent memory and the delta data.

In certain embodiments, further in response to the determining that the first key input profile is not stored in persistent memory: writing the first key input profile to persistent memory when: the first key input profile is at least n bytes in size; and the first key input profile is included in a rolling ledger of the last x key input profiles in use. In certain aspects, further in response to the determining that the first key input profile is not stored in persistent memory: writing the first key input profile to persistent memory when the first key input profile: is at least n bytes in size; is included in a rolling ledger of the last x key input profiles in use; and the persistent memory has not exceeded y % of its recommended write cycles. In some aspects, further in response to the determining that the first key input profile is not stored in persistent memory: writing the first key input profile to persistent memory when the first key input profile: is at least n bytes in size; is included in a rolling ledger of the last x key input profiles in use; and no previous writes to persistent memory have occurred in the last z sessions. In some embodiments, further in response to the determining that the first key input profile is not stored in persistent memory: writing the first key input profile to persistent memory when the first key input profile: is at least n bytes in size; is included in a rolling ledger of the last x key input profiles in use; and the persistent memory has not exceeded y % of its recommended write cycles.

In some embodiments, a non-transitory computer-program product tangibly embodied in a machine-readable non-transitory storage medium that includes instructions configured to cause one or more processors of a keyboard device to perform operations including: receiving, by the one or more processors from a host computing device communicatively coupled thereto, a request to switch to a first key input profile for a plurality of keys on the keyboard device; determining whether the first key input profile is locally stored on the keyboard device in a persistent memory; in response to determining that the first key input profile is stored in persistent memory, programming the plurality of keys using the first key input profile stored in the persistent memory; and in response to determining that the first key input profile is not stored in persistent memory: writing the first key input profile to persistent memory when the first key input profile is at least n bytes in size and programming the plurality of keys using the first key input profile. In certain embodiments, the request to switch the first key input profile for the plurality of keys on the keyboard device includes a first hash code that represents the first key input profile, and determining whether the first key input profile is locally stored on the keyboard device in the persistent memory is based on matching the first hash code with any other hash codes of the key input profiles stored in the persistent memory.

In some implementations, the persistent memory includes a second key input profile with a corresponding second hash code, wherein determining that the first key input profile is not stored in persistent memory further includes: determining that the first hash code does not match any other hash codes of the key input profiles stored in the persistent memory; determining a threshold match between the first key input profile and the second key input profile when the first key input profile differs from the second key input profile by less than a delta of m key assignments; receiving delta data from the host computing device corresponding only to key assignments that differ from the first key input profile to the second key input profile; and programming the plurality of keys to match the first key input profile using the second key profile in persistent memory and the delta data. In some aspects, further in response to the determining that the first key input profile is not stored in persistent memory: writing the first key input profile to persistent memory when: the first key input profile is at least n bytes in size; and the first key input profile is included in a rolling ledger of the last x key input profiles in use. In some embodiments, further in response to the determining that the first key input profile is not stored in persistent memory: writing the first key input profile to persistent memory when the first key input profile: is at least n bytes in size; is included in a rolling ledger of the last x key input profiles in use; and the persistent memory has not exceeded y % of its recommended write cycles. In some cases, further in response to the determining that the first key input profile is not stored in persistent memory: writing the first key input profile to persistent memory when the first key input profile: is at least n bytes in size; is included in a rolling ledger of the last x key input profiles in use; and no previous writes to persistent memory have occurred in the last z sessions.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
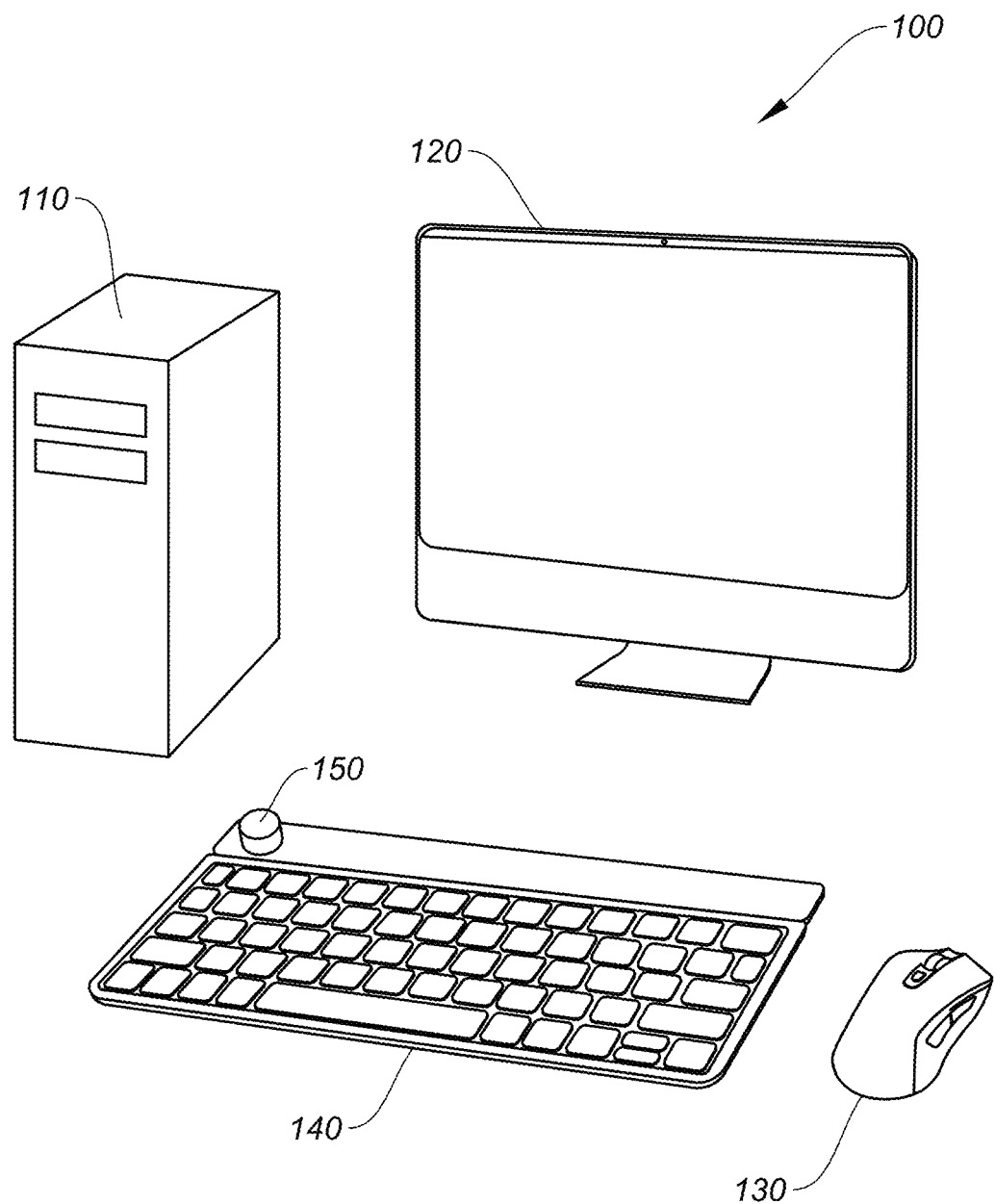
FIG. 1 shows a simplified example of a computer system that can include any of a variety of host computing devices and computer peripheral devices, including computer peripheral devices (e.g., input devices) that can be configured to perform aspects of the various inventive concepts described herein.

Aspects of the present disclosure relate generally to computer peripheral devices, and more particularly to auto-configuring keyboard key profiles, according to certain embodiments.

In the following description, various examples of caching and switching keyboard key profiles are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the figures and presented in the corresponding descriptions provided below. Aspects of the invention relate to caching and switching keyboard key profiles for key customizations. For some introductory context, full key customization (FKC) allows the user to have control over reassigning keyboard keys to perform other functions, such as remapping to a different keyboard layout or performing macro functions specific to games and applications. When used in conjunction with controlling software (also referred to as a "hub") operating on a host computing device, such as Logitech's G HUB® software, users are given a single portal for optimizing and customizing supported computer peripheral devices, including keyboards, computer mice, headsets, speakers, webcams, and the like. In some embodiments, an FKC keyboard can be configured via a hub with mappings that are contextual to the currently used application, wherein the system perform an automatic profile switching function when the new application is used. In some conventional systems, a hub operating on a host computing device (e.g., laptop computer) may send all configuration changes specific to a given profile to the computer peripheral device (e.g., keyboard) in real-time as soon as the profile is activated. For example, a new profile may be activated in Windows-type devices when an "alt+tab" function is pressed to cycle different applications to the foreground, or when a new application is launched. In conventional devices, the configuration data is received by the computer peripheral device and typically stored in the device's random access memory (RAM; volatile memory), and is often either overwritten by the next profile change or reset to a default keyboard setting if the device goes into a power saving state.

With a keyboard utilizing FKC, the larger the set of changes including changed key layouts, shortcuts, macros, and the like, the more data needs to be transmitted from the hub to the keyboard before the keyboard can operate in the remapped state, which can take longer to do in wireless devices that send and receive data slower than their wired equivalents. This can be a problem when a user rapidly changes profiles when switching between applications. For instance, a user may quickly switch between a game with predefined macros and a web browser tutorial, or between two productivity applications (e.g., MS Word, Adobe Photoshop), and then immediately begin typing. In such cases, the profile may not be loaded into the keyboard fast enough and the user will get an unexpected textual output until the keyboard completes the profile change. Aspects of the invention are further described below that utilize novel prioritization and caching techniques, among other implementations, to ensure that computer peripheral devices can rapidly and accurately switch between multiple profiles without a noticeable latency to the user, including in wireless peripheral devices.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 shows a simplified example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 can include computer 110, monitor 120, computer mouse 130, and keyboard 140. In some embodiments, input device 130 can be a computer mouse (e.g., operating on a mouse pad 135), a remote-control device, a game controller (e.g., game pad, joystick, flight stick, etc.) or elements thereof (e.g., hat switch), or other suitable device that can be used to convert analog inputs into digital signals for computer processing. In some cases, keyboard 140 can be a "qwerty" style keyboard, or any suitable input device (e.g., internet-of-things device, AR/VR controller, or the like) with one or more keys that can be reconfigured via a number of different key profiles as further described throughout this disclosure. For computer system 100, input device 140 can be configured to control various aspects of computer 110 and monitor 120, as would be appreciated by one of ordinary skill in the art with the benefit of this disclosure. The monitor 120, computer mouse 130, and keyboard 140 may be referred to as "computer peripheral devices." Computer peripheral devices 120-140 can be communicatively coupled to host computing device 110. Although many of the examples presented herein utilize profile caching structures in a keyboard-type computer peripheral device, it would be understood by those of ordinary skill in the art with the benefit of this disclosure that the usage of profile caching can be applied to any suitable computer peripheral device-typically with a plurality of keys that can be reconfigured for particular users and/or applications.

Computer 110 can be any suitable computing device including, but not limited to, a desktop computer, a laptop computer, a tablet or "phablet" computer, a smart phone, a PDA, a wearable device (e.g., smart watches, smart glasses), virtual reality/augmented reality (AR/VR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor 210 of FIG. 2) to control aspects of the host computing device, for instance, via the one or more computer peripheral devices.

Figure 2:
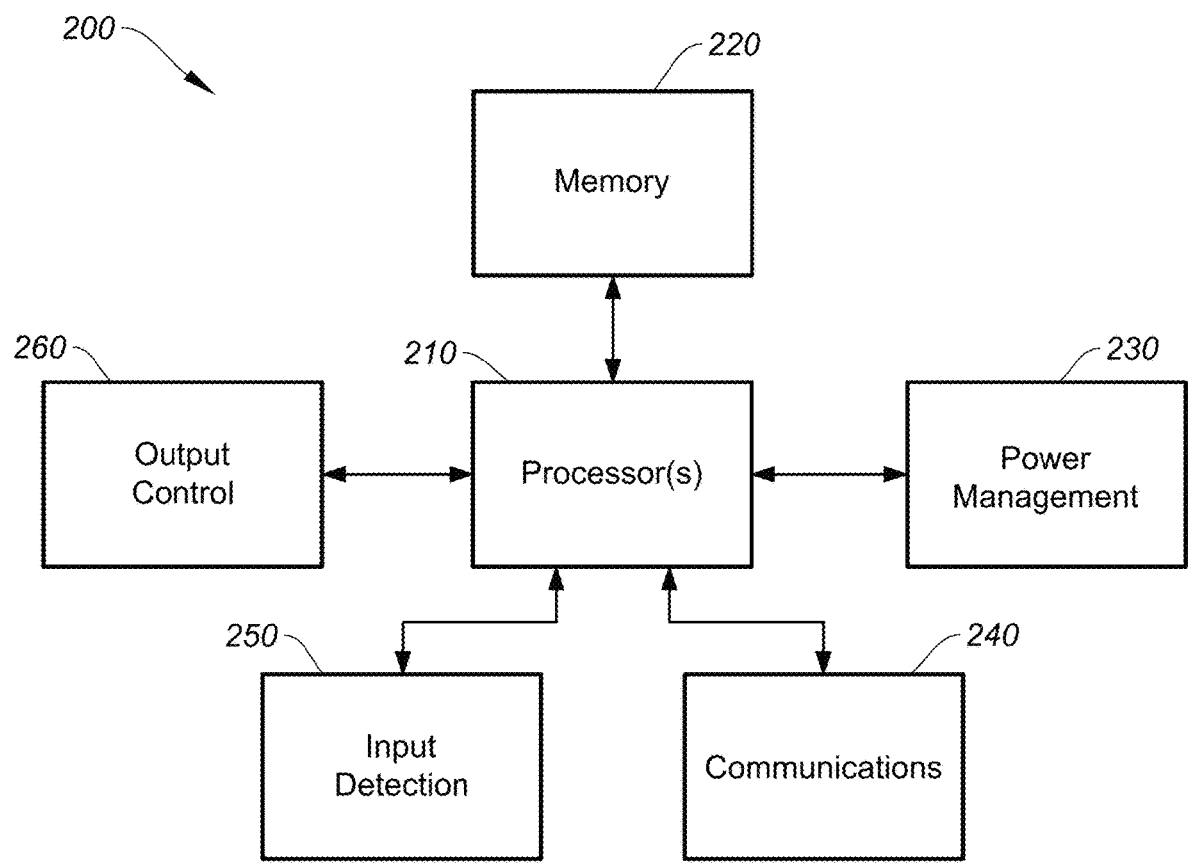
FIG. 2 shows a system for operating a computer peripheral device, according to certain embodiments.

FIG. 2 shows a system 200 for operating a computer peripheral device (e.g., keyboard 140), according to certain embodiments. System 200 may be configured to operate any of the computer peripheral devices shown or not shown herein but within the wide purview of the present disclosure. System 200 may include processor(s) 210, memory 220, a power management block 230, a communication block 240, an input detection block 250, and an output control block 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate blocks, or alternatively, more than one system block may be implemented in a single block. In the context described herein, system 200 can be incorporated into any computer peripheral devices described or mentioned herein and may be further configured with any of the profile caching technology presented herein, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of keyboard 140 (e.g., system blocks 220-260). Alternatively or additionally, some of system blocks 220-260 may include an additional dedicated processor, which may work in conjunction with processor(s) 210. For instance, MCUs, µCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, Zig-Bee, Z-Wave, Logitech Unifying, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in volatile memory (RAM), read-only memory (ROM; programmable ROM), and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution (originating from local memory or off-board memory). In some embodiments, memory 220 may store data corresponding to inputs on the computer peripheral device, such as a detected movement of the computer peripheral device, a sensor (e.g., optical sensor, accelerometer, etc.), activation of one or more input elements (e.g., key structures, buttons, sliders, touch-sensitive regions, etc.), or the like. Stored data may be aggregated and sent via reports to a host computing device.

In certain embodiments, processor(s) 210 may operate in conjunction with memory 220 and communications block 240 to facilitate switching between keyboard input profiles, as further described with respect to the figures that follow. For instance, processor(s) 210 may receive requests from a host computer device (e.g., via a hub) to switch to a keyboard input profile and the processor(s) 210 may query memory 220 to determine if the keyboard input profile is stored in persistent memory (e.g., ROM, such as an EEPROM) and apply the profile to the keyboard keys if it is, processor(s) 210 may write to persistent memory (ROM) if the keyboard input profile is not present in onboard memory, or processor(s) 210 may simply write to RAM in scenarios where it is not a good use of memory resources to store the keyboard input profile in persistent memory, as further discussed below.

In certain embodiments, memory 220 can store the various data described throughout this disclosure. For example, memory 220 can include multiple keyboard input profiles that can be applied to the keyboard keys, as further described below. Memory 220 can be used to store any suitable data to perform any function described herein and as would be appreciated by one of ordinary skill in the art with the benefit of this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled switches, etc.) as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements on an input device. For instance, input detection module 250 can detect user inputs from motion sensors, keys, or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 or subset thereof can be subsumed by processor 210, or in combination therewith.

In some embodiments, input detection module 250 can detect a touch or touch gesture on one or more touch sensitive surfaces on keyboard 140. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection block 250 can include touch and/or proximity sensing capabilities. Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

In some embodiments, output control module 260 can control various outputs for a corresponding computer peripheral device. For instance, output control module 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
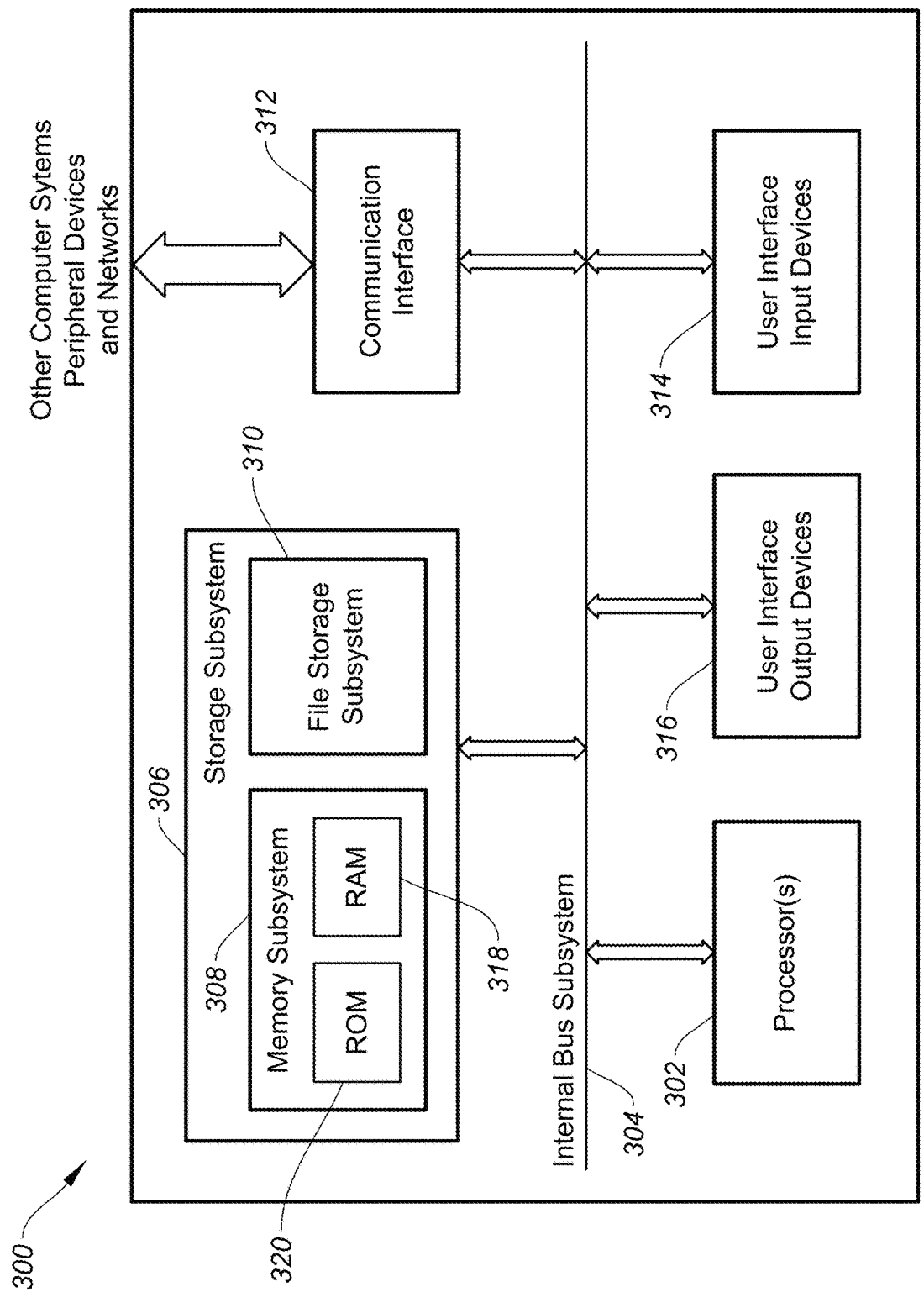
FIG. 3 is a simplified block diagram of a host computing device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" may refer to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

In some aspects, storage subsystem 306 may store hub software to control aspects of switching a keyboard input profile on a computer peripheral device communicatively coupled thereto. The hub software may operate as further described with respect to the figures that follow.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Computer Peripheral Device Caching

As described above, a computer peripheral device (e.g., keyboard) utilizing FKC with large sets of changes including changed key layouts, shortcuts, macros, and the like, needs to be transmitted from a hub to the keyboard before the keyboard can operate in the remapped state, which can take longer to do in wireless devices that send and receive data slower than their wired equivalents. This can be a problem when a user rapidly changes profiles when switching between applications. For instance, a user may quickly switch between a game with predefined macros and a web browser tutorial, or between two productivity applications (e.g., MS Word, Adobe Photoshop), and then immediately begin typing. In such cases, the profile may not be loaded into the keyboard fast enough and the user will get an unexpected textual output until the keyboard completes the profile change. Aspects of the invention are further described below that utilize novel prioritization and caching techniques, among other implementations, to ensure that computer peripheral devices can rapidly and accurately switch between multiple profiles without a noticeable latency to the user, including in wireless peripheral devices.

Figure 4:
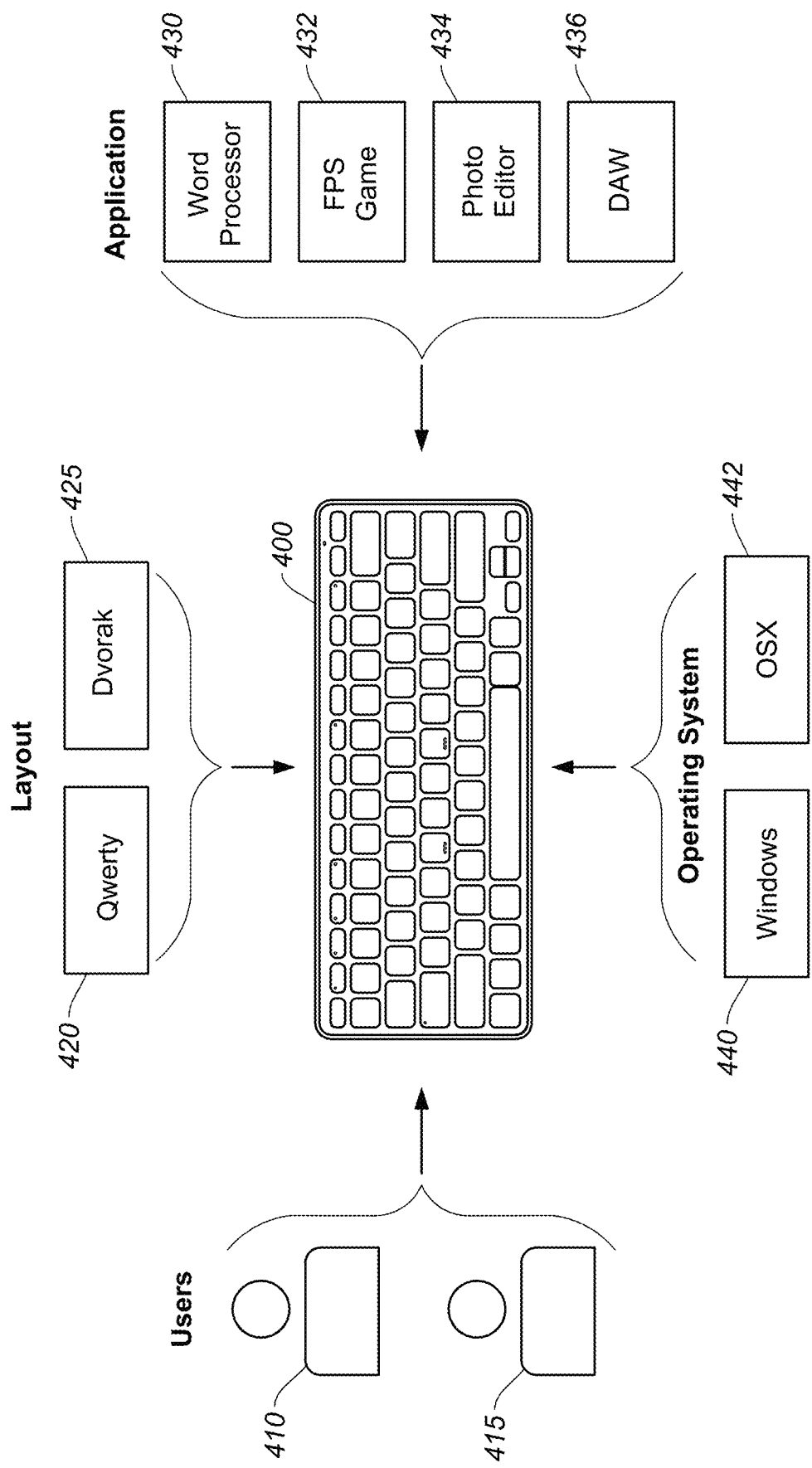
FIG. 4 shows a keyboard with a number of different key input profile settings, according to certain embodiments.

FIG. 4 shows a keyboard 400 with a number of different key input profile settings, according to certain embodiments. Keyboard 400 may include a number of different users 410, 415 that may have specific keyboard input profile configurations that they prefer and when they login the keyboard 400 needs to be updated and configured accordingly. In some cases, keyboard 400 may be configured in different alphanumeric configurations, such as in a conventional "Qwerty" key layout 420, or the more exotic "Dvorak" key layout 425. Different software applications may be used that remap certain key functions to one or more keys. Some common examples may include a word processor 430, video games (e.g., FPS) 432, media editing software 434, and digital audio workstations 436, to name a few. In some cases, operating systems may have specific key layout configurations, including Windows® 440, OSX® 442, and others (e.g., MacOS, Android, Linux, Unix, iOS, etc.). Other causes of a key layout change are possible, as would be appreciated by one of ordinary skill in the art with the benefit of this disclosure. Key input profiles can include changes to an overall key mapping that may change anywhere from one to all of the keys in a key array. Key input profiles may also be referred to herein as a "key layout," "key configuration layout," "key layout configuration," "or similar terms or phrases that are meant to convey associated key functions over an array of keys.

In certain embodiments, an on-device caching mechanism can be used improve the speed at which a profile change can be enacted in the computer peripheral device as well as the impact on battery life caused by sending excessive numbers of wireless packets to transfer the profile change data. That is, instead of streaming a large amount of data in real-time from host computer to the computer peripheral device (e.g., keyboard) to switch to a new key input profile, the keyboard may have key input profiles stored locally for quicker access, execution, and less power dissipation that would have otherwise been used for the multi-packet wireless data transfer. Such a system may have a cache directory, and several sectors of varying sizes in which "host mode" profiles (e.g., profiles intended for use by the hub while it is running) are written. The cache may be split between space for "on-board mode" profiles and host profiles. A profile management program may manage on-board profile files and feature-specific settings in a file system that resides in persistent storage (e.g., ROM, EEPROM, etc.) in the keyboard (e.g., memory 220).

To design such a system, a number of challenges need to be addressed. First, a keyboard can work with multiple instances of a hub, such as when a user has multiple PCs, or when a family has a single PC with multiple user accounts. This can be mitigated by using an identifying hash (e.g., CRC32) of the remapping key input profile data, which the hub can use to identify and match it to its own host mode key input profiles. This method has the added benefit of permitting re-use of identical profiles between instances of the hub as opposed to a method storing a unique profile identifier (e.g., UID). An example where this may apply would be a DVORAK key layout user sharing a keyboard between a gaming PC and a laptop. This identifying hash can serve three benefits including a first benefit where computing the CRC32 on-device, or loading the entire profile back into the PC to compute the CRC32 is a time-consuming operation on startup of the hub software (e.g., GHUB), by storing the CRC32, this step can be skipped. A second benefit may include avoiding re-writing like data to the flash memory of the device. As the flash memory has a limited number of write-cycles, any writes to the memory should be triggered by user-initiated behavior, such as changing a configuration or setting. The third benefit is that a hash of the profile can allow similar profiles to be re-used across different machines, or user accounts, freeing up space on the device and lowering the chance of software having to overwrite the flash memory, as described above.

Another issue is that the target keyboard(s) for FKC will have a limited amount of on-board storage in flash memory (e.g., ROM, EEPROM of memory 220). This memory has a limited number of write cycles and writing to the flash memory can be a time consuming process that may result in a detectable latency to a user, so the hub may not be able to implement FKC in a way that switches between key input profiles aggressively when memory contention is encountered. Additionally, multi-hub use cases of switching between PCs or user accounts have to be taken into account.

Profile Use Tracking

In certain embodiments, the hub is configured to track how and when key input profiles are used to actively manage key input profiles stored on the keyboard and its corresponding space constraints. A basic approach would be to track and order the key input profiles by the most frequently switched to, or the most time used. However, this methodology may not consistently adhere to an important goal of quickly switching between key input profiles on the keyboard, and the speed at which key input profiles can be wirelessly sent to the keyboard is directly proportional to the size of the key input profile in bytes. For instance, a frequently used but small remapping key input profile may take 50 ms to send to the keyboard (an acceptable latency in most instances), but a larger and less frequently used key input profile may take 500 ms to transfer, which can be an unacceptable latency in some cases. Thus, caching the larger, but less frequently used, key input profiles may accommodate lower latency key input profile switching in most cases.

In some cases, user behavior with respect to what data is best cached may also change over time, so a user who regularly plays game "A," but over a six month period shifts their playing habits to favor game "B" may cause the hub to adapt the contents of the cache to better suit this changing use pattern. A method of addressing this is to use a rolling average of time spent using various applications. A hub can be configured to keep a rolling ledger of the last n hours of use (e.g., 300 hours) and track what key input profiles were used for that time period. Sessions that use a key input profile outside of that 300 hours will drop off the ledger, thereby keeping a snapshot of the most frequently used key input profiles. In some implementations, the ledger can be read into memory from settings storage when the hub backend process start up, seconds of profile use are added—to and then the updated ledger is committed back to memory upon shutdown of the hub backend. In other words and by way of example, a hub (e.g., G HUB) can read from permanent storage its record-keeping of how many seconds each game/profile has been active. This reading typically happens once on startup. Once in memory, these figures and totals can be added to, but typically will not be committed to permanent storage (e.g., hard disk or SSD) until G HUB shuts down. G HUB "shutting down" is an automatic process that happens when the PC goes to sleep, user account is switched, PC is shut down or restarted, or the user manually exists G HUB.

In some embodiments, determining whether conditions have been met to write a new key input profile to on-board memory of the keyboard (or other suitable computer peripheral device), some considerations to account for include: (1) how long has it been since the last time the hub wrote a key input profile to the keyboard, thereby triggering a write and/or erase cycle?; (2) has enough changed on a given key input profile that it merits a full write? (e.g., will the user be experiencing degraded performance without a write cycle?); and (3) is there any competing for use of the cache space with another instance of the hub on another machine or user account? (e.g., are the profile directory and file hashes recognized by the hub as having written to memory?). For (2) above, an example can include a first key input profile (e.g., stored in keyboard memory) differing by a second key input profile (e.g., to be sent by the hub on the host computing device) by thirty or more keys. In that case, a full write may be warranted. On the other hand, if the first and second key input profiles only differ by less than five keys, it may be more time efficient to modify the first input profile by said five keys on the keyboard.

Once a remapping key input profile is set and/or the directory has been written, any of the written profiles can be rapidly switched to because they reside locally on the keyboard and do not need to be received externally from the host computing device. However, in the case that the hub determines that it will use a key input profile without going through the steps of writing to flash, the data can be transferred directly into volatile memory (RAM) for immediate usage. This comes with the caveat about latency, as described above. However, when and where to use this method will also factor heavily in the design of a robust key input profile caching solution.

Profile Caching Suitability Scoring

In some cases, in order for the hub to determine if it is necessary to write a new remapped key input profile and/or directory to the keyboard, and in order for the hub to determine the key input profiles that need to be written to memory, a method for scoring the key input profiles can be used. In the event that persistent storage memory (e.g., flash memory, ROM, EEPROM) is not filled completely, existing data in the cache may be written around, e.g., any unrecognized profile can be left in situ in case another instance of the hub is reliant on that profile. In some aspects, key input profiles can be scored against a size threshold. For instance, if the key input profile is under n bytes long, it can be exempt from caching as it would be inefficient to activate such a key input profile, both in terms of time taken (e.g., <50 ms) and battery power consumed. In other words, if the key input profile is under n bytes long, sending the entire key input profile will not take too long, i.e., will not cause an unsatisfactory latency that could affect the user experience (UX). Once a list of key input profiles that exceed the size threshold (n) has been accrued, then that list can be sorted in such a way to improve the UX. Sorting can be based on the product of the size of the key input profile and the duration of the user of the key input profile in the aforementioned rolling ledger, along with a weighting constant that controls the relative importance of one metric versus the other (e.g., byte size vs. time used). Thus, in certain embodiments, the hub is configured to fit the most time-consuming key input profiles to transfer into persistent storage that the user(s) most commonly use.

Some examples of quantifying the relative importance are described here. In cases where the persistent memory may be filled entirely by the proposed key input profile data set, then the flash memory may only contain profiles from the current hub instance after writing—e.g., as many as can fit, and written in the order of scoring, according to certain embodiments. Thus, in a situation where two user accounts (or machines) with dissimilar G HUB profiles are in use, G HUB in each case will take steps to avoid overwriting data on a device from the other user account, utilize free space on the device in preference to overwriting, and take additional measures to avoid overwriting the device on each account switch as and where necessary, such as keeping a leger of the date and time the previous write(s) occurred. Furthermore, the scoring system for whether to write a profile described above is similar to triaging based on need, and the estimated benefit to the user is the metric used to determine a hierarchy of profiles to write. Thus, in some cases, only the profiles that then fit into the memory space are written, in the sorted order. A metric that can be used to determine need is a product of the size of the profile and the likelihood of that profile being used by the user (plus a weighting factor for each). By way of examples, if User A has three games: Game 1 has 2 macros; Game 2 has 25 macros; Game 3 has 10 macros; and for each of these games, the time to send to the device may be: Game 1:20 milliseconds; Game 2:250 milliseconds; Game 3:100 milliseconds; the user will not notice the latency in transmission of Game 1, but will likely for Game 2 and possibly Game 3. For each of the 3 Games, G HUB can keep a record of how many hours they have been played in the last month, e.g., Game 1:20 hours; Game 2:0.5 hours; Game 3:5 hours. Given the size of the profiles, the keyboard may only be able to fit the smaller (Game 1) profile and either Game 2 or Game 3. In some cases, a naive algorithm (not the novel embodiments described herein) would pick the biggest profile (Game 2) and determine that profile to be optimal to put on the device cache to avoid the latency in transmission, however, because the number of played hours is tracked, it may be preferred to put Game 3 into the cache instead, even though it is smaller.

Determining When to Write to Persistent Memory

In some embodiments, when a computer peripheral device is detected by the hub (e.g., keyboard is detected by the host computing device—also referred to as a "device arrival event"), the hub may read in a key input profile directory on the keyboard's persistent memory. This gives the hub an immediate indication of what key input profiles are contained on the keyboard while the hub activates the current profile via either a write to volatile memory (transferring the profile without caching) or via activating an existing cached key input profile. Saving the key input profile to persistent memory can be performed simultaneously or at a later time that does not interfere with the UX.

Typically, a user interaction with the keyboard can be divided into two categories: (1) day-to-day productivity and/or gaming with the hub operating in the background; and (2) the hub being used to actively configure the keyboard. During (2), it may not be advantageous or efficient to write to persistent memory after each configuration change. Some implementations may incorporate some or all of the following methods to safeguard write cycles for persistent memory: (1) avoid writing to a computer peripheral device that exceeds x number (e.g., 95%) of its (rated) lifetime write-cycles. In such cases, the user may be prompted that degraded performance may be experienced when switching applications; (2) avoid writing more than once per hub session, e.g., each FKC computer peripheral device should be written to once in the lifetime of a hub backend instance (reset when the hub is closed, updated, or the PC goes into sleep mode); avoid writing the same information twice. The hub should \check what is on the computer peripheral device to see if it matches its host-stored key input profiles, and write if there is one or more key input profiles exceeding the threshold where a write is merited (e.g., cache is missing a frequently used key input profile that is slow to transfer to the computer peripheral device; and (4) avoid writing within y minutes of the last configuration change, or if the hub frontend is open. One of ordinary skill in the art with the benefit of this disclosure would appreciate the many modifications, variations, and alternative embodiments thereof.

Figure 5:
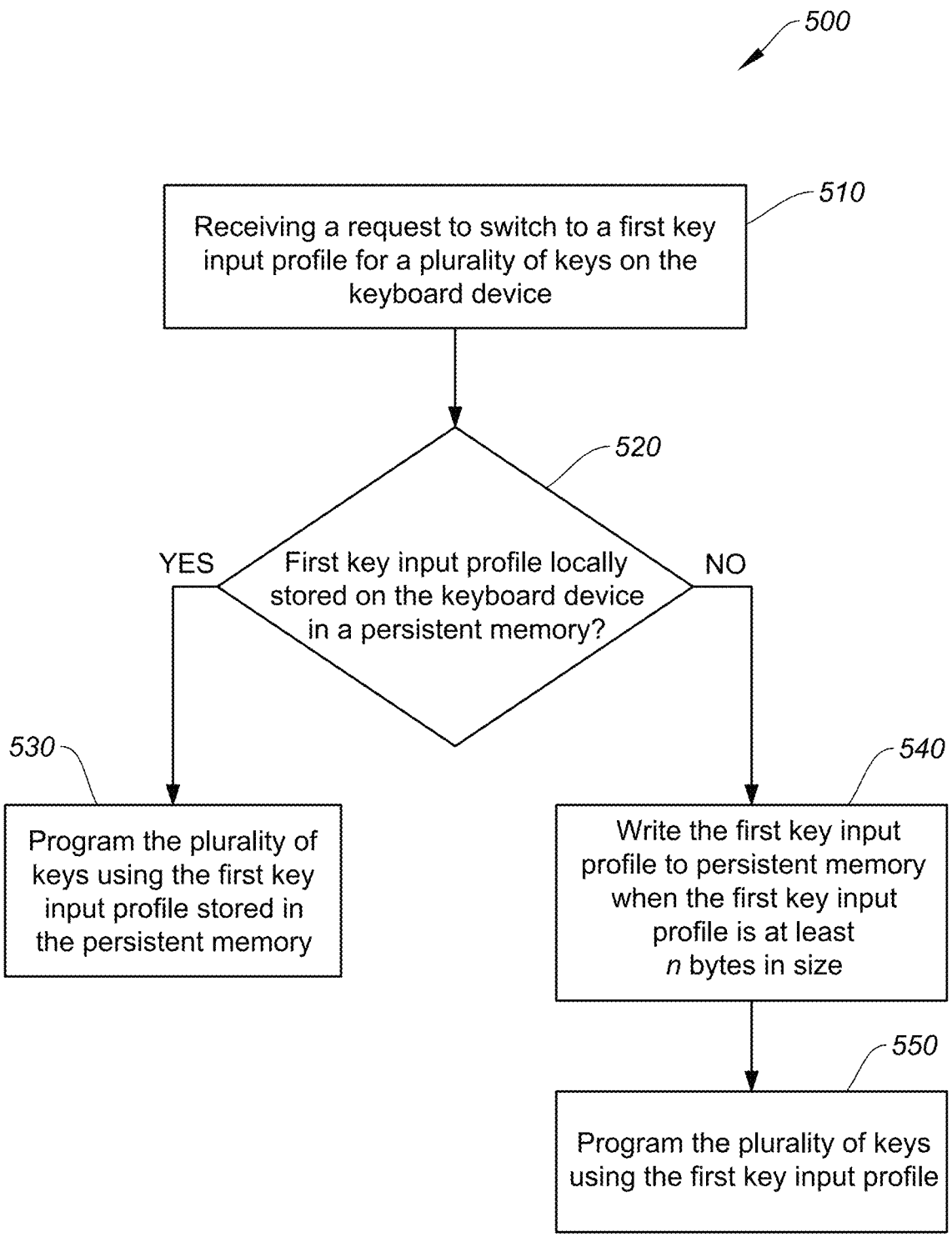
FIG. 5 is a simplified flow chart showing aspects of a method for key input profile caching in an input device, according to certain embodiments.

FIG. 5 is a simplified flow chart showing aspects of a method 500 for key input profile caching in an input device, according to certain embodiments. Method 500 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 500 can be performed by aspects of system 200, 300, or a combination thereof.

At operation 510, method 500 can include receiving, by one or more processors of a keyboard device from a host computing device communicatively coupled thereto, a request to switch to a first key input profile for a plurality of keys on the keyboard device, according to certain embodiments.

At operation 520, method 500 can include determining whether the first key input profile is locally stored on the keyboard device in a persistent memory, according to certain embodiments.

At operation 530 in response to determining that the first key input profile is stored in persistent memory, method 500 can include programming the plurality of keys using the first key input profile stored in the persistent memory, according to certain embodiments.

At operation 540 in response to determining that the first key input profile is not stored in persistent memory, method 500 can include writing the first key input profile to persistent memory when the first key input profile is at least n bytes in size, according to certain embodiments. In some aspects, the request to switch the first key input profile for the plurality of keys on the keyboard device includes a first hash code that represents the first key input profile, and determining whether the first key input profile is locally stored on the keyboard device in the persistent memory is based on matching the first hash code with any other hash codes of the key input profiles stored in the persistent memory.

In some embodiments, the persistent memory includes a second key input profile with a corresponding second hash code, wherein determining that the first key input profile is not stored in persistent memory further includes determining that the first hash code does not match any other hash codes of the key input profiles stored in the persistent memory, determining a threshold match between the first key input profile and the second key input profile when the first key input profile differs from the second key input profile by less than a delta of m key assignments, receiving delta data from the host computing device corresponding only to key assignments that differ from the first key input profile to the second key input profile, and programming the plurality of keys to match the first key input profile using the second key profile in persistent memory and the delta data. In certain embodiments, further in response to the determining that the first key input profile is not stored in persistent memory, the method can include writing the first key input profile to persistent memory when the first key input profile is at least n bytes in size and the first key input profile is included in a rolling ledger of the last x key input profiles in use (e.g., the last 300 key input profiles, the last 100 key input profiles, or other suitable amount, as would be appreciated by one of ordinary skill in the art with the benefit of this disclosure). In some embodiments, further in response to the determining that the first key input profile is not stored in persistent memory, method 500 can include writing the first key input profile to persistent memory when the first key input profile is at least n bytes in size (e.g., 1 Kb or more), is included in a rolling ledger of the last x key input profiles in use, and the persistent memory has not exceeded y % (e.g., 80%, 90%, 95%, or other suitable value) of its recommended write cycles.

In some aspects, further in response to the determining that the first key input profile is not stored in persistent memory, method 500 can include writing the first key input profile to persistent memory when the first key input profile is at least n bytes in size, is included in a rolling ledger of the last x key input profiles in use, and no previous writes to persistent memory have occurred in the last z sessions (e.g., z=1, 10, 20, etc.). In further aspects, further in response to the determining that the first key input profile is not stored in persistent memory, method 500 can include writing the first key input profile to persistent memory when the first key input profile is at least n bytes in size, is included in a rolling ledger of the last x key input profiles in use, and the persistent memory has not exceeded y % of its recommended write cycles.

In certain embodiments, the host computing device may store a clone of the key input profiles stored in the input device in memory 220, and may represent each key input profile with a hash key (e.g., 4-bit field). The host computing device may receive instructions to switch to a new key input profile, so the host computing device may query the input device to see if the desired key input profile is stored in persistent memory already. The query can include the hash key and the input device can determine if the key input profile is stored in persistent memory by simply checking if the hash key matches with hash keys of stored key input profiles in persistent memory. If it does, the input device can switch to the desired on-board key input profile quickly without having to have the entire data set (e.g., 104 keys) sent over multiple communications from the host computing device, thus saving significant time and bandwidth. In some aspects, the hash codes from on-board key input devices stored in persistent memory can be returned to the host computing device and if there is no match, but an on-board key input profile closely matches the desired key input profile, then the host computing device can send the difference information (e.g., keys that differ between the desired and on-board key input profile) so that the input device can load the on-board key input profile and alter only the different keys received from the host computing device. In other words, rather than sending instructions for 104+ keys, in some cases only a small subset of data for keys (e.g., <10 keys) needs to be sent, so the desired key input profile can still be loaded comparatively very quickly as compared to having to send data for the entire key input profile.

At operation 550, method 500 can include programming the plurality of keys using the first key input profile, according to certain embodiments.

It should be appreciated that the specific steps illustrated in FIG. 5 provide a particular method 500 for key input profile caching in an input device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Thus, the various embodiments presented herein differ from conventional persistent remapping in a number of ways. For example, caching is now contextual with built in priorities of which key input profiles to be persistent and which will be stored in volatile memory (e.g., not stored in long term memory). Also, input device profiles can extend beyond key profiles and may include lighting profiles, audio profiles, or any other configuration of input or output data in any suitable combination, as would be appreciated by one of ordinary skill in the art with the benefit of this disclosure. In some aspects, predictive analytics can be used to determine which key input profiles a user is most likely to use. For instance, over a period of time (e.g., 3 month span) a user might often switch from a first application with a first key input profile to a second application to a second key input profile. With this usage history, persistent memory can be preloaded with the key input profiles that are likely to be used by the user so that the input device is more likely to having key input profiles in persistent memory when switching between a user's most used applications. One of ordinary skill in the art with the benefit of this disclosure would appreciate the many modifications, variations, and alternative embodiments thereof.

Figure 6:
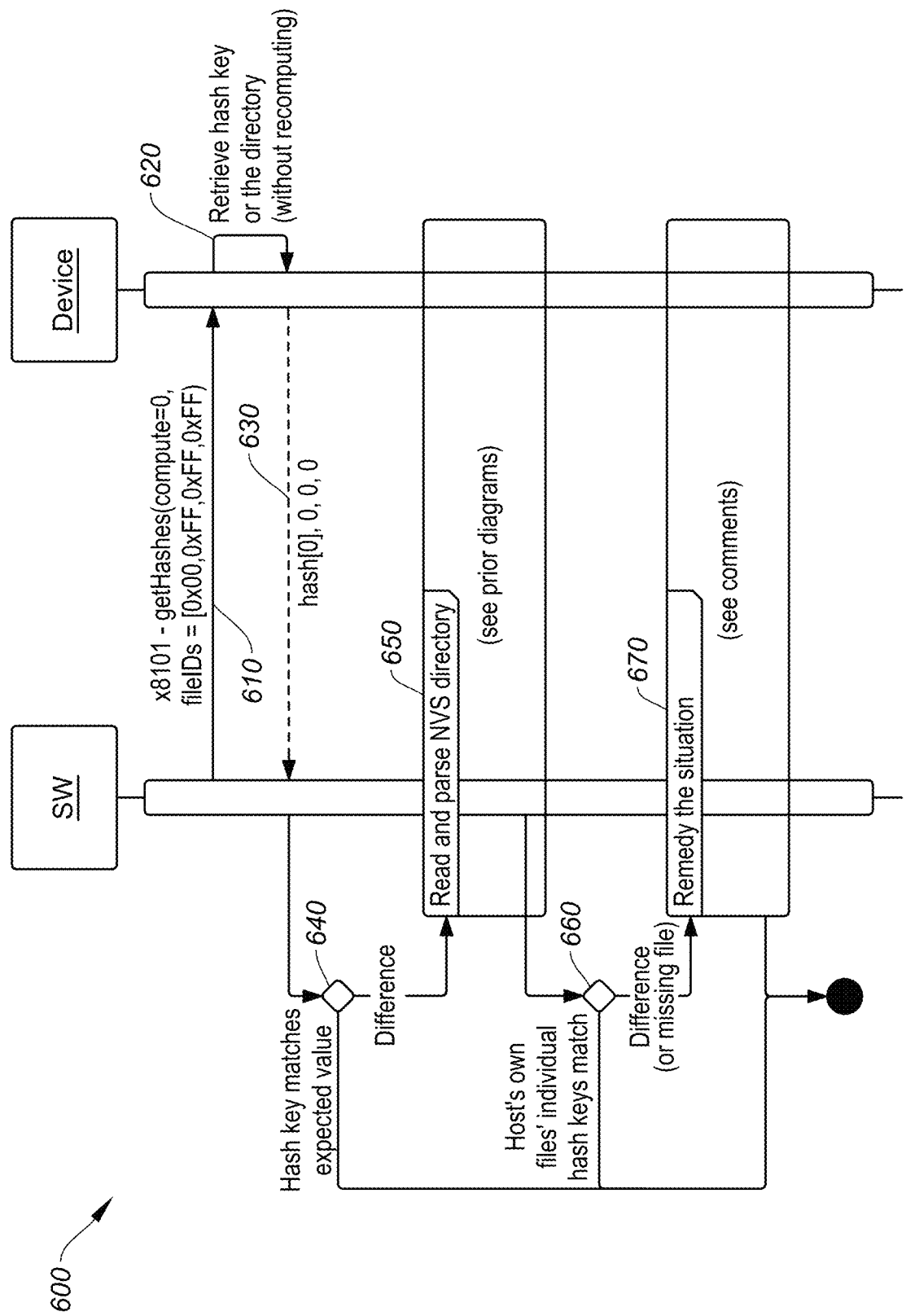
FIG. 6 is a simplified flow chart showing aspects of a method for key input profile caching in an input device, according to certain embodiments.

FIG. 6 is a simplified flow chart showing aspects of a method 600 for key input profile caching in an input device, according to certain embodiments. Method 600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 600 can be performed by aspects of system 200 (e.g., processor(s) 210), 300, or a combination thereof. Method 600 shows an interaction between software on a host computing device, such as a hub operating on a desktop computer, and firmware on a device, such as a computer keyboard configured to store cached key input profiles.

As described above the host computing device may query the input device (e.g., keyboard) to determine if a requested key input profile is present on the keyboard (KB). If so, the KB can load the desired key input profile locally, and typically with a very fast load time (e.g., <50 ms). Otherwise, the host computing device may have to wirelessly send part or all of the key input profile, which may take up to 500 ms or more, and can create problems when a user rapidly switches between applications and types, as described above, which can take less than 500 ms and may result in a user pressing specific keys, functions, macros, etc., and getting a different outcome than they expect until the key input profile has finished loading on the input device. For example, some photo editing tools may map the 'M' key for a paste function. If a user switches to a word processor and types a word with the letter 'M' before the key input profile is loaded, then a paste function may still apply despite the user's intention to simply enter an alphanumeric key. It takes time for the hub to recognize the change. Thus, key input profile caching in the internal memory (e.g., memory 220) of the input device can allow a single communications round trip (e.g., hash code match request) to instantiate a new key input profile from the input device side rather than multiple back and forth wireless messages (e.g., sending data over multiple submissions for a 104 key change in a new key input profile) as would be required in conventional devices. In some embodiments, multiple key input profiles can be stored in the input device and aspects of the invention may any suitable size memory to accommodate a local directory of multiple key input profiles (e.g., 15 kB, 100 KB, etc.). Thus, new key input profiles may only need to be sent from the host computing device when the key input profile doesn't exist on the input device internal memory. In some aspects, if a similar key input profile exists, the host computing device may only have to send data corresponding to the keys that differ, thus the total send time/bandwidth may be substantially reduced.

Referring back to method 600, at operation 610, the method can include sending one or more hash codes from the host computer software (HCS) to the keyboard (KB), according to certain embodiments. For instance, the host PC may request the hashes from the device (e.g., keyboard) for files in the directory. The host PC can refer to the files it wants hashes for by index, e.g., requesting hashes for the files in position 2, 3 and 4.

At operation 620, method 600 can include retrieving a hash key or a corresponding directory without the need to recompute it, according to certain embodiments. In some aspects, the CRC32 hash is stored as the last 4 bytes of the profile, and therefore may be pre-computed.

At operation 630, method 600 can include sending the hash code from the KB to the HCS, according to certain embodiments.

At operation 640, method 600 can include determining whether the hash key matches an expected value (e.g., do the hash codes match, and thus is the desired key input profile on board KB local memory?). In some aspects, this allows the HCS to see what is stored on the device without taking the time to load the full profile from the device over a wireless connection, which can be slow. Because the system knows and tracks what was written to the device at any point, the system then knows what profiles exist on the device based on their CRC32 hash. This can have the added benefit of allowing small updates or tweaks to a profile if the user has made one or two setting changes on top of a bigger profile and G HUB does not have to re-write the profile, but instead can load the out-of-date (large) profile, and make a small change to it in RAM, which takes less time and limits the number of flash write cycles. This is typically only possible if G HUB tracks change history for profiles that it knows it wrote to the device. Thus, if the hash key matches, then the process ends (indicated by a black dot), otherwise, method 600 continues to operation 650.

At operation 650, method 600 can include reading and parsing the directory, according to certain embodiments. If G HUB does not know what profiles are on the device (e.g., if overwritten on another HCS instance), then the system takes the additional step to retrieve the full profile from memory (e.g., NVS) in order to compute the differences. In some aspects, a goal for HCS is checking the contents of flash storage with a requirement that HCS has retrieved the NVS directory and knows how many files there are and their location. Thus, (1) HCS asks for a list of hashes for the following n files (e.g., up to 4 per request); (2): nth device returns a list of 4 byte hashes for each file; (3): HCS compares returned hashes against what it knows it last wrote; (4): If there is an unknown hash, HCS can optionally load in the full profile, to see if it is a close match to a known profile; and (5): The HCS can optionally decide to write or overwrite a profile to the device that it thinks would match the criteria for a cached profile (operation 660) to resolve the mismatch (operation 670).

Figure 7:
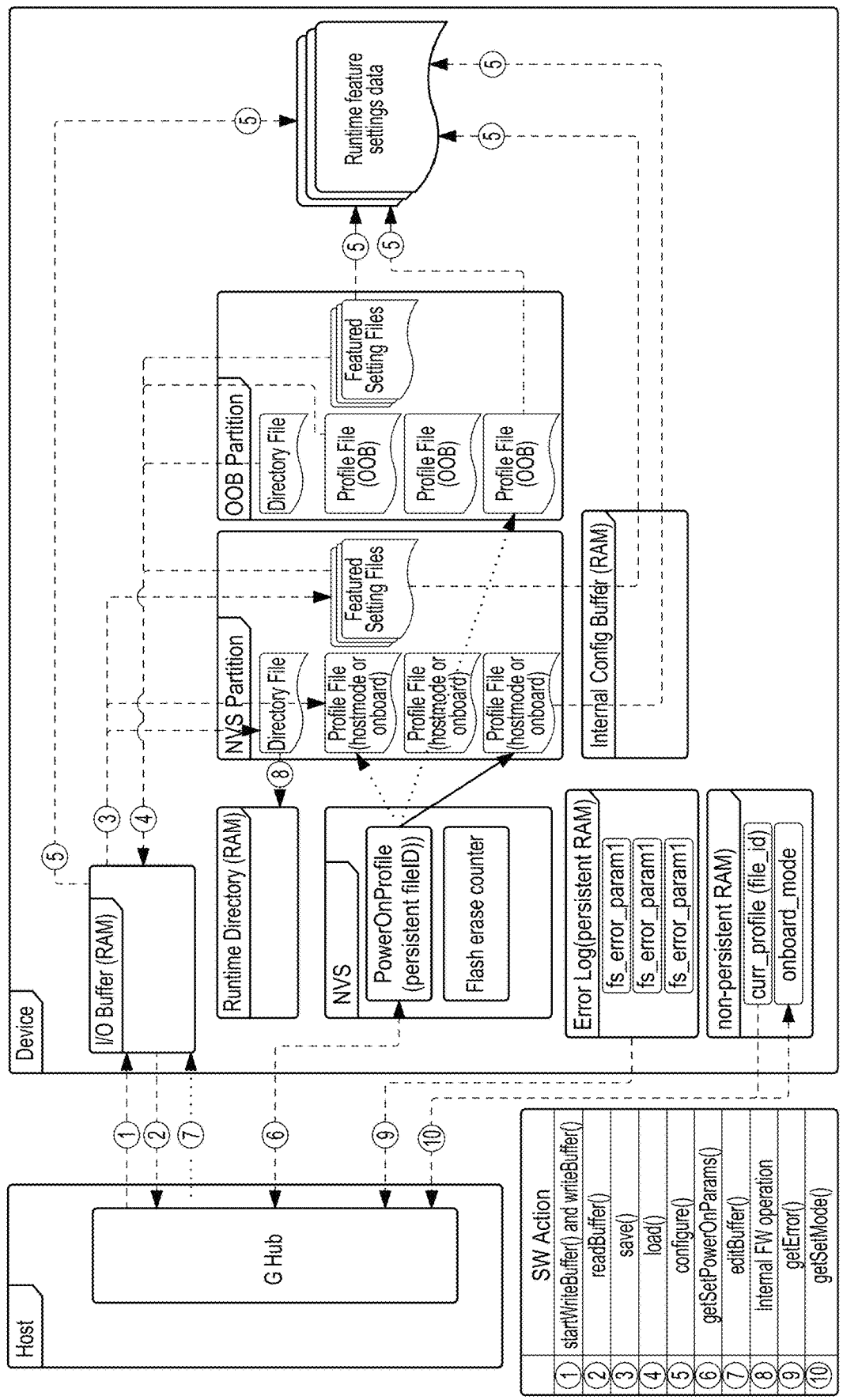
FIG. 7 is a block diagram flow chart showing operations for key input profile caching on an input device, according to certain embodiments.

FIG. 7 is a block diagram flow chart 700 showing operations for key input profile caching on an input device, according to certain embodiments. Flow chart 700 shows aspects of power-on-profiles, flash erase counters, out-of-the-box partitions, and system-level components that interact in the manner described throughout this disclosure, as would be appreciated by one of ordinary skill in the art with the benefit of this disclosure.

Most embodiments utilize at least one network that would be familiar to those skilled in the art for supporting communications using any of a variety of commercially available protocols, such as TCP/IP, UDP, OSI, FTP, UPP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
   receiving, by one or more processors of a keyboard device from a host computing device communicatively coupled thereto, a request to switch to a first key input profile for a plurality of keys on the keyboard device;
   determining whether the first key input profile is locally stored on the keyboard device in a persistent memory;
   in response to determining that the first key input profile is stored in persistent memory, programming the plurality of keys using the first key input profile stored in the persistent memory; and
   in response to determining that the first key input profile is not stored in persistent memory: writing the first key input profile to persistent memory when the first key input profile is at least n bytes in size and programming the plurality of keys using the first key input profile,
   wherein the request to switch the first key input profile for the plurality of keys on the keyboard device includes a first hash code that represents the first key input profile, and
   wherein determining whether the first key input profile is locally stored on the keyboard device in the persistent memory is based on matching the first hash code with any other hash codes of the key input profiles stored in the persistent memory.

2. The computer-implemented method of claim 1 wherein the persistent memory includes a second key input profile with a corresponding second hash code, wherein determining that the first key input profile is not stored in persistent memory further includes:
   determining that the first hash code does not match any other hash codes of the key input profiles stored in the persistent memory;
   determining a threshold match between the first key input profile and the second key input profile when the first key input profile differs from the second key input profile by less than a delta of m key assignments;
   receiving delta data from the host computing device corresponding only to key assignments that differ from the first key input profile to the second key input profile; and
   programming the plurality of keys to match the first key input profile using the second key profile in persistent memory and the delta data.

3. The computer-implemented method of claim 1 wherein further in response to the determining that the first key input profile is not stored in persistent memory: writing the first key input profile to persistent memory when:
   the first key input profile is at least n bytes in size; and
   the first key input profile is included in a rolling ledger of the last x key input profiles in use.

4. The computer-implemented method of claim 1 wherein further in response to the determining that the first key input profile is not stored in persistent memory: writing the first key input profile to persistent memory when the first key input profile:
   is at least n bytes in size;
   is included in a rolling ledger of the last x key input profiles in use; and
   the persistent memory has not exceeded y % of its recommended write cycles.

5. The computer-implemented method of claim 1 further in response to the determining that the first key input profile is not stored in persistent memory: writing the first key input profile to persistent memory when the first key input profile:
   is at least n bytes in size;
   is included in a rolling ledger of the last x key input profiles in use; and
   no previous writes to persistent memory have occurred in the last z sessions.

6. The computer-implemented method of claim 1 further in response to the determining that the first key input profile is not stored in persistent memory: writing the first key input profile to persistent memory when the first key input profile:
   is at least n bytes in size;
   is included in a rolling ledger of the last x key input profiles in use; and
   the persistent memory has not exceeded y % of its recommended write cycles.

7. A keyboard device comprising:
   one or more processors;
   one or more non-transitory, computer-readable storage mediums containing instructions configured to cause the one or more processors to perform operations including:
   receiving, by the one or more processors from a host computing device communicatively coupled thereto, a request to switch to a first key input profile for a plurality of keys on the keyboard device;
   determining whether the first key input profile is locally stored on the keyboard device in a persistent memory;
   in response to determining that the first key input profile is stored in persistent memory, programming the plurality of keys using the first key input profile stored in the persistent memory; and
   in response to determining that the first key input profile is not stored in persistent memory: writing the first key input profile to persistent memory when the first key input profile is at least n bytes in size and programming the plurality of keys using the first key input profile,
   wherein the request to switch the first key input profile for the plurality of keys on the keyboard device includes a first hash code that represents the first key input profile, and
   wherein determining whether the first key input profile is locally stored on the keyboard device in the persistent memory is based on matching the first hash code with any other hash codes of the key input profiles stored in the persistent memory.

8. The keyboard device of claim 7 wherein the persistent memory includes a second key input profile with a corresponding second hash code,
wherein determining that the first key input profile is not stored in persistent memory further includes:
determining that the first hash code does not match any other hash codes of the key input profiles stored in the persistent memory;
determining a threshold match between the first key input profile and the second key input profile when the first key input profile differs from the second key input profile by less than a delta of m key assignments;
receiving delta data from the host computing device corresponding only to key assignments that differ from the first key input profile to the second key input profile; and
programming the plurality of keys to match the first key input profile using the second key profile in persistent memory and the delta data.

9. The keyboard device of claim 7 wherein further in response to the determining that the first key input profile is not stored in persistent memory: writing the first key input profile to persistent memory when:
the first key input profile is at least n bytes in size; and
the first key input profile is included in a rolling ledger of the last x key input profiles in use.

10. The keyboard device of claim 7 wherein further in response to the determining that the first key input profile is not stored in persistent memory: writing the first key input profile to persistent memory when the first key input profile:
is at least n bytes in size;
is included in a rolling ledger of the last x key input profiles in use; and
the persistent memory has not exceeded y % of its recommended write cycles.

11. The keyboard device of claim 7 further in response to the determining that the first key input profile is not stored in persistent memory: writing the first key input profile to persistent memory when the first key input profile:
is at least n bytes in size;
is included in a rolling ledger of the last x key input profiles in use; and
no previous writes to persistent memory have occurred in the last z sessions.

12. The keyboard device of claim 7 further in response to the determining that the first key input profile is not stored in persistent memory: writing the first key input profile to persistent memory when the first key input profile:
is at least n bytes in size;
is included in a rolling ledger of the last x key input profiles in use; and
the persistent memory has not exceeded y % of its recommended write cycles.

13. A non-transitory computer-program product tangibly embodied in a machine-readable non-transitory storage medium that includes instructions configured to cause one or more processors of a keyboard device to perform operations including:
receiving, by the one or more processors from a host computing device communicatively coupled thereto, a request to switch to a first key input profile for a plurality of keys on the keyboard device;
determining whether the first key input profile is locally stored on the keyboard device in a persistent memory;
in response to determining that the first key input profile is stored in persistent memory, programming the plurality of keys using the first key input profile stored in the persistent memory; and
in response to determining that the first key input profile is not stored in persistent memory: writing the first key input profile to persistent memory when the first key input profile is at least n bytes in size and programming the plurality of keys using the first key input profile
wherein the request to switch the first key input profile for the plurality of keys on the keyboard device includes a first hash code that represents the first key input profile, and
wherein determining whether the first key input profile is locally stored on the keyboard device in the persistent memory is based on matching the first hash code with any other hash codes of the key input profiles stored in the persistent memory.

14. The non-transitory computer-program product of claim 13 wherein the persistent memory includes a second key input profile with a corresponding second hash code,
wherein determining that the first key input profile is not stored in persistent memory further includes:
determining that the first hash code does not match any other hash codes of the key input profiles stored in the persistent memory;
determining a threshold match between the first key input profile and the second key input profile when the first key input profile differs from the second key input profile by less than a delta of m key assignments;
receiving delta data from the host computing device corresponding only to key assignments that differ from the first key input profile to the second key input profile; and
programming the plurality of keys to match the first key input profile using the second key profile in persistent memory and the delta data.

15. The non-transitory computer-program product of claim 13 wherein further in response to the determining that the first key input profile is not stored in persistent memory: writing the first key input profile to persistent memory when:
the first key input profile is at least n bytes in size; and
the first key input profile is included in a rolling ledger of the last x key input profiles in use.

16. The non-transitory computer-program product of claim 13 wherein further in response to the determining that the first key input profile is not stored in persistent memory: writing the first key input profile to persistent memory when the first key input profile:
is at least n bytes in size;
is included in a rolling ledger of the last x key input profiles in use; and
the persistent memory has not exceeded y % of its recommended write cycles.

17. The non-transitory computer-program product of claim 13 further in response to the determining that the first key input profile is not stored in persistent memory: writing the first key input profile to persistent memory when the first key input profile:
is at least n bytes in size;
is included in a rolling ledger of the last x key input profiles in use; and
no previous writes to persistent memory have occurred in the last z sessions.

* * * * *